US012575983B2

(12) United States Patent
Heneveld

(10) Patent No.: US 12,575,983 B2
(45) Date of Patent: *Mar. 17, 2026

(54) PATIENT TRANSPORT APPARATUS WITH MOTION DAMPENING

(71) Applicant: Stryker Corporation, Kalamazoo, MI (US)

(72) Inventor: Ross Heneveld, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 313 days.

This patent is subject to a terminal disclaimer.

(21) Appl. No.: 18/212,924

(22) Filed: Jun. 22, 2023

(65) Prior Publication Data

US 2023/0338210 A1     Oct. 26, 2023

Related U.S. Application Data

(63) Continuation of application No. 16/555,148, filed on Aug. 29, 2019, now Pat. No. 11,723,819.

(Continued)

(51) Int. Cl.
*A61G 3/08*          (2006.01)
*A61G 1/02*          (2006.01)
(Continued)

(52) U.S. Cl.
CPC ......... *A61G 3/0891* (2013.01); *A61G 1/0243* (2013.01); *A61G 1/0287* (2013.01);
(Continued)

(58) Field of Classification Search
CPC ...... A61G 3/0891; A61G 1/00; A61G 1/0237; A61G 1/0243; A61G 1/0287; A61G 3/00;
(Continued)

(56) References Cited

U.S. PATENT DOCUMENTS 4,097,941 A     7/1978   Merkel
6,752,224 B2    6/2004   Hopper et al.
(Continued)

FOREIGN PATENT DOCUMENTS

GB          2289113 A     11/1995
WO    WO-2004064698 A2 *  8/2004   ............... A61G 1/06

*Primary Examiner* — Madison Emanski
(74) *Attorney, Agent, or Firm* — Howard & Howard Attorneys PLLC

(57)          ABSTRACT

A patient transport apparatus is provided for use with a retainer of a transport vehicle. The patient transport apparatus comprises a support structure comprising a patient support surface to support a patient. An engagement member is coupled to the support structure and arranged to engage the retainer when unloading the patient transport apparatus from the transport vehicle. A dampener is operable in a standby state or a resistance state such that the dampener provides increased resistance to movement of the patient transport apparatus in the resistance state as compared to the standby state. The resistance state of the dampener is activated by manually moving the patient transport apparatus in a first direction and the standby state is activated by manually moving the patient transport apparatus in a second direction, opposite the first direction.

20 Claims, 10 Drawing Sheets

Related U.S. Application Data

(60) Provisional application No. 62/724,707, filed on Aug. 30, 2018.

(51) Int. Cl.
| | |
|---|---|
| *A61G 3/02* | (2006.01) |
| *B60B 33/00* | (2006.01) |
| *B60B 33/02* | (2006.01) |

(52) U.S. Cl.
CPC ........ *A61G 3/0254* (2013.01); *B60B 33/0086* (2013.01); *B60B 33/021* (2013.01); *A61G 2200/32* (2013.01); *A61G 2203/70* (2013.01); *B60B 33/0078* (2013.01)

(58) Field of Classification Search
CPC ...... A61G 3/0875; A61G 3/0254; A61G 5/10; A61G 5/1013; A61G 5/1016; A61G 2200/32; A61G 2203/70; A61G 3/0218; B60B 33/0078; B60B 33/0086; B60B 33/0089; B60B 33/023; B60B 33/02; B60B 33/021; Y10T 403/32581; Y10T 16/544; Y10T 16/5406; Y10T 70/7282
USPC .......................................................... 296/20
See application file for complete search history.

(56) References Cited

U.S. PATENT DOCUMENTS

| | | | |
|---|---|---|---|
| 7,398,571 | B2 | 7/2008 | Souke et al. |
| 8,156,586 | B2 | 4/2012 | Reed et al. |
| 8,856,989 | B2 | 10/2014 | Lambarth et al. |
| 2017/0100289 | A1 | 4/2017 | Naber et al. |
| 2020/0069486 | A1 | 3/2020 | Heneveld |

\* cited by examiner

PATIENT TRANSPORT APPARATUS WITH MOTION DAMPENING

CROSS-REFERENCE TO RELATED APPLICATIONS

The subject patent application is a Continuation of U.S. patent application Ser. No. 16/555,148 filed on Aug. 29, 2019, which claims priority to and all the benefits of U.S. Provisional Patent Application No. 62/724,707 filed on Aug. 30, 2018, the disclosures of each of which are hereby incorporated by reference in their entirety.

BACKGROUND

Patient transport apparatuses, such as hospital beds, stretchers, cots, wheelchairs, and chairs facilitate care and transportation of patients. Conventional patient transport apparatuses comprise a base having wheels, a lift mechanism, and a litter comprising a patient support surface upon which the patient is supported. The litter may generally be raised and lowered relative to a transport surface (e.g., ground) to allow for care and transportation of the patient.

Some patient transport apparatuses are designed to be routinely loaded into and unloaded from an emergency transport vehicle, such as an ambulance. A retainer may be employed in the transport vehicle to facilitate loading and unloading of the patient transport apparatus. Such a retainer typically comprises a hook fixed to a floor surface of the transport vehicle. An engagement member, such as an engagement bar, is arranged adjacent a head end of the patient transport apparatus to engage and be captured by the hook during loading and unloading. For example, during loading, the head end of the patient transport apparatus is first placed in the transport vehicle such that the engagement bar is captured by the hook to hold the head end in place in the transport vehicle and prevent the head end from being inadvertently withdrawn from the transport vehicle. The head end of the patient transport apparatus may comprise separate loading wheels to bear on the floor surface of the transport vehicle during loading. With the loading wheels secured on the floor surface, the lift mechanism is actuated to raise the base and its wheels, while users hold the foot end of the patient transport apparatus to keep the litter and the patient at a comfortable elevation during loading. Once the wheels on the base are at a level suitable for loading onto the floor surface of the transport vehicle, the users then push the patient transport apparatus into the transport vehicle until the patient transport apparatus is fully in the transport vehicle. The patient transport apparatus is secured in place for transport.

When the transport vehicle arrives at its destination, such as an emergency entrance of a hospital, the patient transport apparatus is then unloaded from the transport vehicle. A reverse of the loading process takes place. The users pull the foot end of the patient transport apparatus out of the transport vehicle until the base and its wheels clear the floor surface and the engagement bar once again engages the hook. In this case, the hook acts to inhibit the users from inadvertently pulling the entire patient transport apparatus out of the transport vehicle, which could otherwise result in the head end dropping a significant distance from the floor surface to the ground. Accordingly, with the hook securing the head end of the patient transport apparatus in the transport vehicle, the lift mechanism can be actuated to lower the base and its wheels to the ground to stabilize the patient transport apparatus. Thereafter, the engagement bar may be manually released from the hook to enable the users to fully remove the patient transport apparatus from the transport vehicle.

In some situations, when initially pulling the patient transport apparatus from the transport vehicle, the engagement bar may inadvertently miss and pass the hook and allow the entire patient transport apparatus to be pulled from the transport vehicle before the base and wheels can be lowered to the ground. This could occur if the patient transport apparatus is being pulled out at an excessive speed and/or in a manner that results in the engagement bar bouncing over the hook.

A patient transport apparatus capable of overcoming one or more of the aforementioned disadvantages is desired.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
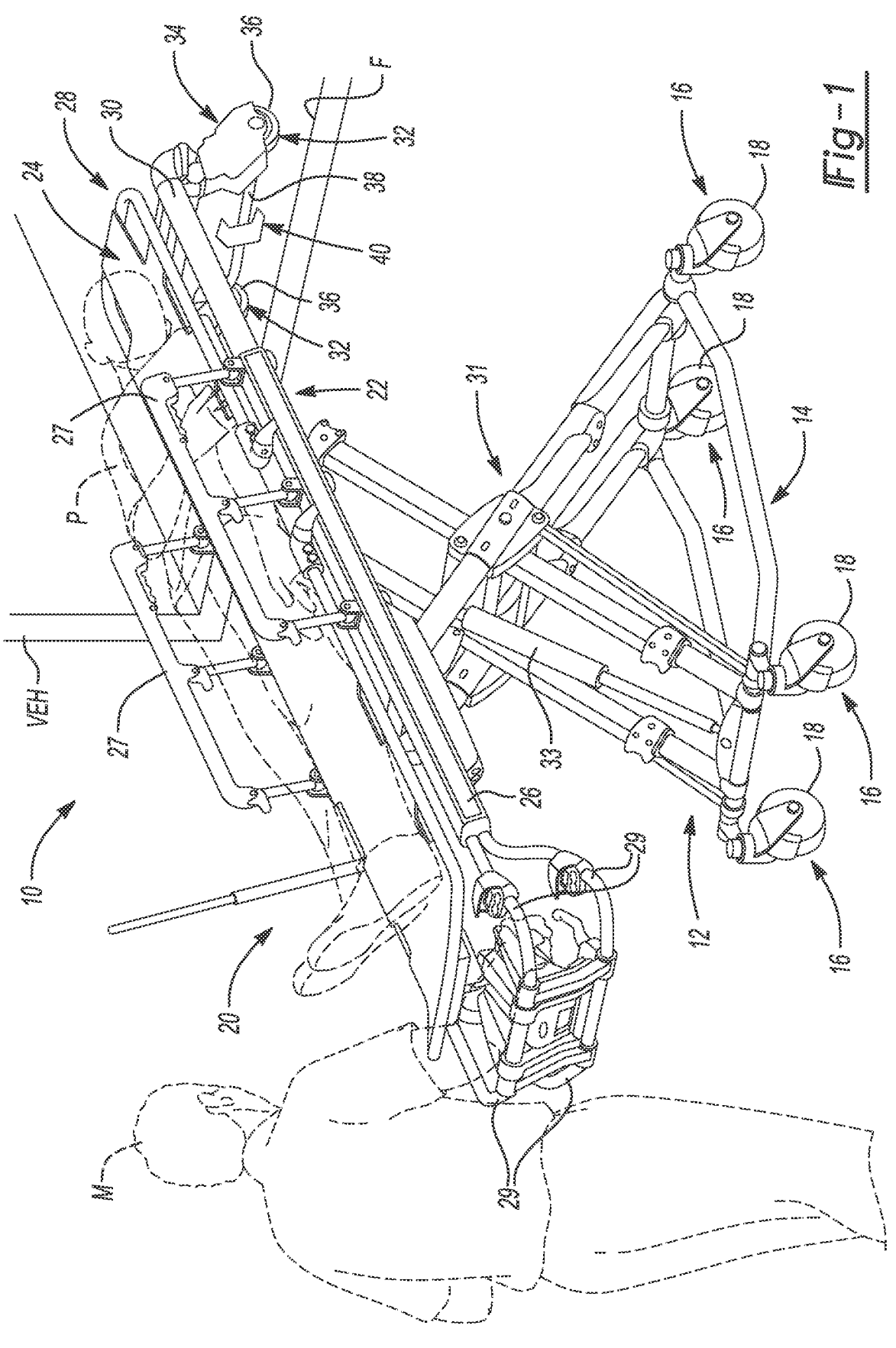
FIG. 1 is a perspective view of a patient transport apparatus.

Referring to FIG. 1, a patient transport apparatus 10 is shown for supporting a patient P in a transportation setting. The patient transport apparatus 10 illustrated in FIG. 1 comprises a cot. In other embodiments, however, the patient transport apparatus 10 may comprise a hospital bed, stretcher, wheelchair, chair, or similar apparatus utilized in the transportation and care of a patient.

The patient transport apparatus 10 comprises a support structure 12 to provide support for the patient. The support structure 12 comprises a base frame 14. The base frame 14 may comprise longitudinally extending frame members and crosswise extending frame members interconnected at ends thereof to form a generally rectangular base frame. A plurality of caster wheel assemblies 16 with caster wheels 18 are operatively connected proximate each corner of the base frame 14. The caster wheels 18 may be configured to swivel to facilitate turning of the patient transport apparatus 10. One or more of the caster wheel assemblies 16 may comprise a brake to prevent rotation of its associated caster wheel 18 when engaged. One or more of the caster wheel assemblies 16 may also comprise a swivel locking mechanism to prevent is associated caster wheel 18 from swiveling when engaged.

The support structure 12 further comprises a litter 20 comprising a litter frame 22. The litter 20 comprises a patient support deck having one or more articulable sections, such as a back section and/or a foot section. The patient support deck is supported by the litter frame 22. The patient support deck comprises a patient support surface 24 configured to support the patient P. The litter frame 22 may comprise frame rails 26 extending longitudinally (e.g., on one or both sides of the litter frame 22). The litter frame 22 may further comprise a retracting head section 28. The retracting head section 28 comprises a pair of telescoping frame rails 30 (only one shown) that slide in and out relative to the frame rails 26 from a retracted position to an extended position or one or more positions in between (extended position shown in FIG. 1).

Side rails 27 may extend from opposing sides of the litter frame 22 to provide egress barriers for the patient P on the patient support surface 24. The side rails 27, along with other handles 29, may be utilized by a user U, such as an emergency medical technician or other medical professional, to manually move or manipulate the patient transport apparatus 10.

A lift mechanism 31 may be configured to interconnect the base frame 14 and the litter 20 to facilitate raising and lowering of the litter 20 relative to a transport surface (e.g., ground). The lift mechanism 31 may be manipulated to adjust the height of the litter 20 to a maximum height (see, e.g., FIG. 1), a minimum height, or any intermediate height in between the maximum and minimum heights. The lift mechanism 31 may comprise an actuator system comprising one or more actuators 33 configured to manipulate a pair of X frames to raise and lower the litter 20. Such a lift mechanism is described in U.S. Pat. No. 7,398,571, filed on Jun. 30, 2005, entitled, "Ambulance Cot and Hydraulic Elevating Mechanism Therefor," the disclosure of which is hereby incorporated herein by reference. Other types of lift mechanisms may also be employed.

One or more loading wheel assemblies 32 are coupled to the support structure 12. It should be appreciated that the loading wheel assemblies 32 may be connected to any suitable location on the patient transport apparatus 10, such as on the frame rails 26, on the patient support deck, connected to the base frame 14, or the like. In the embodiment shown, a pair of loading wheel assemblies 32 are connected to the retracting head section 28 and are movable in elevation relative to the caster wheel assemblies 16 via the lift mechanism 31. Each of the load wheel assemblies 32 comprise a wheel housing 34 and a loading wheel 36 rotatably supported by the wheel housing 34 to engage a floor surface F, such as the floor surface F of an emergency transport vehicle VEH (e.g., ambulance, helicopter, etc.). Ideally, the loading wheels 36 are positioned and configured to facilitate loading and unloading of the patient transport apparatus 10 into and out of the transport vehicle VEH.

An engagement member 38 is coupled to the support structure 12. The engagement member 38 is arranged to engage a retainer 40 located in the transport vehicle VEH when loading and unloading the patient transport apparatus 10 into and out of the transport vehicle VEH. The engagement member 38 may comprise any form of engagement device suitable for being engaged by the retainer 40, such as a bar, latch, catch, etc. In the version shown, the engagement member 38 comprises a bar that is pivotally coupled to the support structure 12, e.g., pivotally connected to the retracting head section 28. The bar may be U-shaped, elongated, and/or cylindrical, or may be any other suitable shape or configuration. The retainer 40 may comprise a hook, latch, catch, etc., or any other shape or configuration of retention device suitable for engaging and retaining the engagement member 38. Collectively, in one embodiment, the patient transport apparatus 10 and the retainer 40 may be referred to as a patient transport system.

Figure 2:
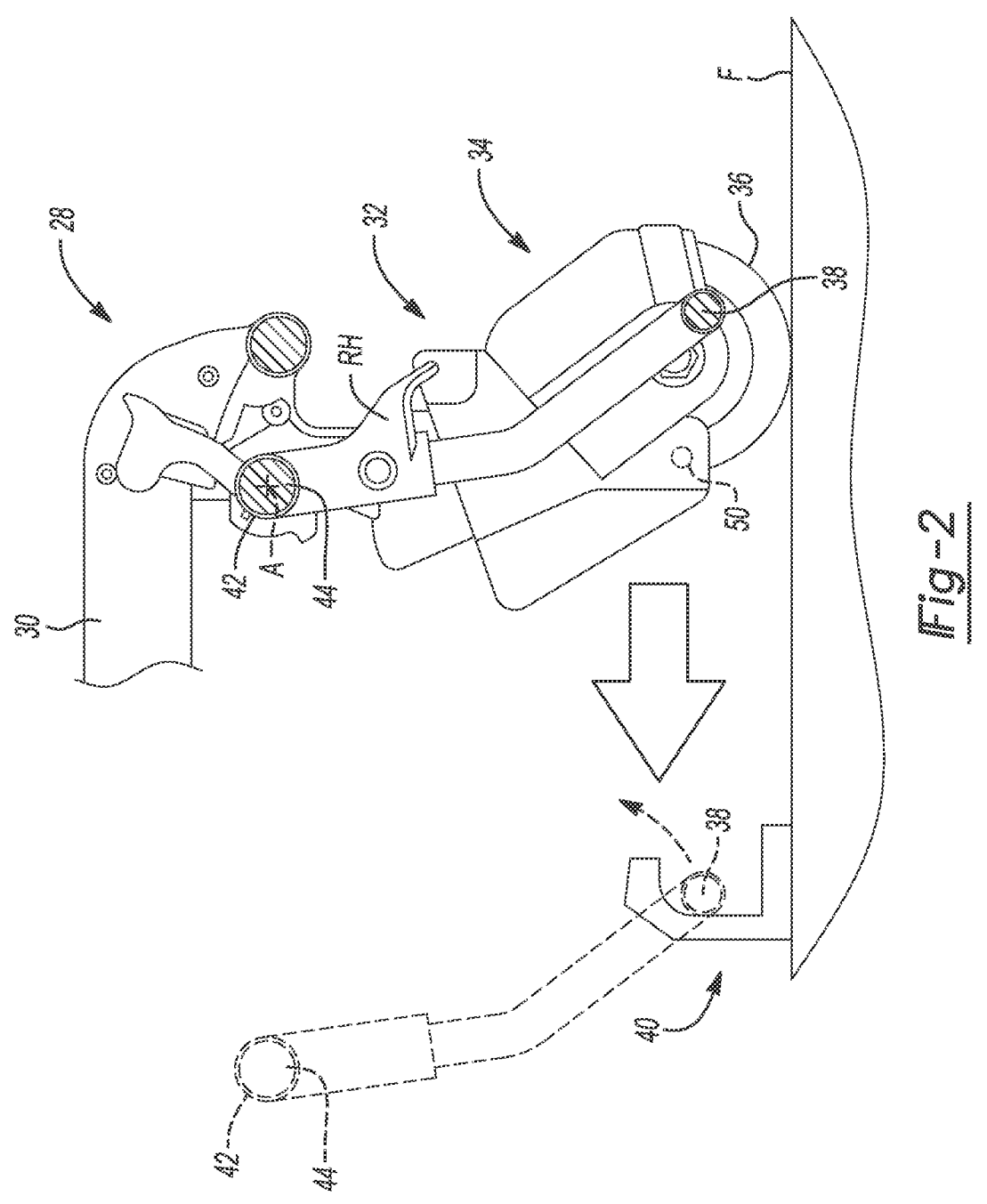
FIG. 2 is a cross-sectional view illustrating engagement of an engagement member of the patient transport apparatus by a retainer.

A biasing device 42 (see FIG. 2), such as a torsion spring, may be provided to act between the engagement member 38 and the retracting head section 28 to bias the engagement member 38 into a generally downward direction toward the floor surface F of the transport vehicle VEH to facilitate capturing of the engagement member 38 by the retainer 40, as shown in FIG. 2. The biasing device 42 also allows the engagement member 38 to be pivoted away from the floor surface F—this facilitates disconnecting the engagement member 38 from the retainer 40 as will be described below. The biasing device 42 may be disposed about a pivot rod 44 of the engagement member 38 that pivots relative to the telescoping frame rail 30 about a pivot axis A. As shown, a release handle RH may be fixed to the engagement member 38 to facilitate pivoting of the engagement member 38 about the pivot axis A to release the engagement member 38 from the retainer 40.

FIG. 1 illustrates the patient transport apparatus 10 being loaded into the transport vehicle VEH. The patient transport apparatus 10 is designed to be routinely loaded into and unloaded from the transport vehicle VEH. The retainer 40 facilitates loading and unloading of the patient transport apparatus 10. In the version shown, the retainer 40 comprises a hook fixed to the floor surface F of the transport vehicle VEH. The engagement member 38 is arranged adjacent a head end of the patient transport apparatus 10 and is shaped to engage and be captured by the retainer 40 during loading and unloading. For example, during loading, the head end of the patient transport apparatus 10 is first placed in the transport vehicle VEH such that the engagement member 38 is captured by the retainer 40 to hold the head end in place in the transport vehicle VEH and prevent the head end from being inadvertently withdrawn from the transport vehicle VEH. The loading wheels 36 bear on the floor surface F during loading. With the loading wheels 36 secured on the floor surface F, owing to retention of the patient transport apparatus 10 via the retainer 40, the lift mechanism 31 is actuated to raise the base frame 14 and caster wheels 18, while one or more users U hold a foot end of the patient transport apparatus 10 to keep the litter 20 and the patient P at a comfortable elevation during loading. Once the caster wheels 18 are at a level suitable for loading onto the floor surface F of the transport vehicle VEH, the users U then push the patient transport apparatus 10 into the transport vehicle VEH until the patient transport apparatus 10 is fully in the transport vehicle VEH, i.e., the base frame 14 and the caster wheels 18 are supported on the floor surface F. The patient transport apparatus 10 is secured in place for transport.

When the transport vehicle VEH arrives at its destination, such as an emergency entrance of a hospital, the patient transport apparatus 10 is then unloaded from the transport vehicle VEH. A reverse of the loading process takes place. The users U pull the foot end of the patient transport apparatus 10 out of the transport vehicle VEH until the base frame 14 and caster wheels 18 clear the floor surface F and the engagement member 38 once again engages the retainer 40. In this case, the retainer 40 acts to inhibit the users U from inadvertently pulling the entire patient transport apparatus 10 out of the transport vehicle VEH, which could otherwise result in the head end dropping a significant distance from the floor surface F to ground. Accordingly, with the retainer 40 securing the head end of the patient transport apparatus 10 in the transport vehicle VEH, the lift mechanism 31 can be actuated to lower the base frame 14 and the caster wheels 18 to the ground (as shown in FIG. 1) to stabilize the patient transport apparatus 10. Thereafter, the engagement member 38 may be manually released from the retainer 40 to enable the users U to fully remove the patient transport apparatus 10 from the transport vehicle VEH. FIG. 2 illustrates a close-up of operation of the engagement member 38 and the retainer 40 during unloading. As shown, while the head end of the patient transport apparatus 10 is being pulled toward the retainer 40, the engagement member 38 has a cylindrical bar portion that is at an elevation suitable for being captured by the retainer 40 as described. A broken line with arrow illustrates the manner in which the engagement member 38 can be pivoted to release the engagement member 38 from the retainer 40 once the base frame 14 and caster wheels 18 are on the ground.

Figure 3:
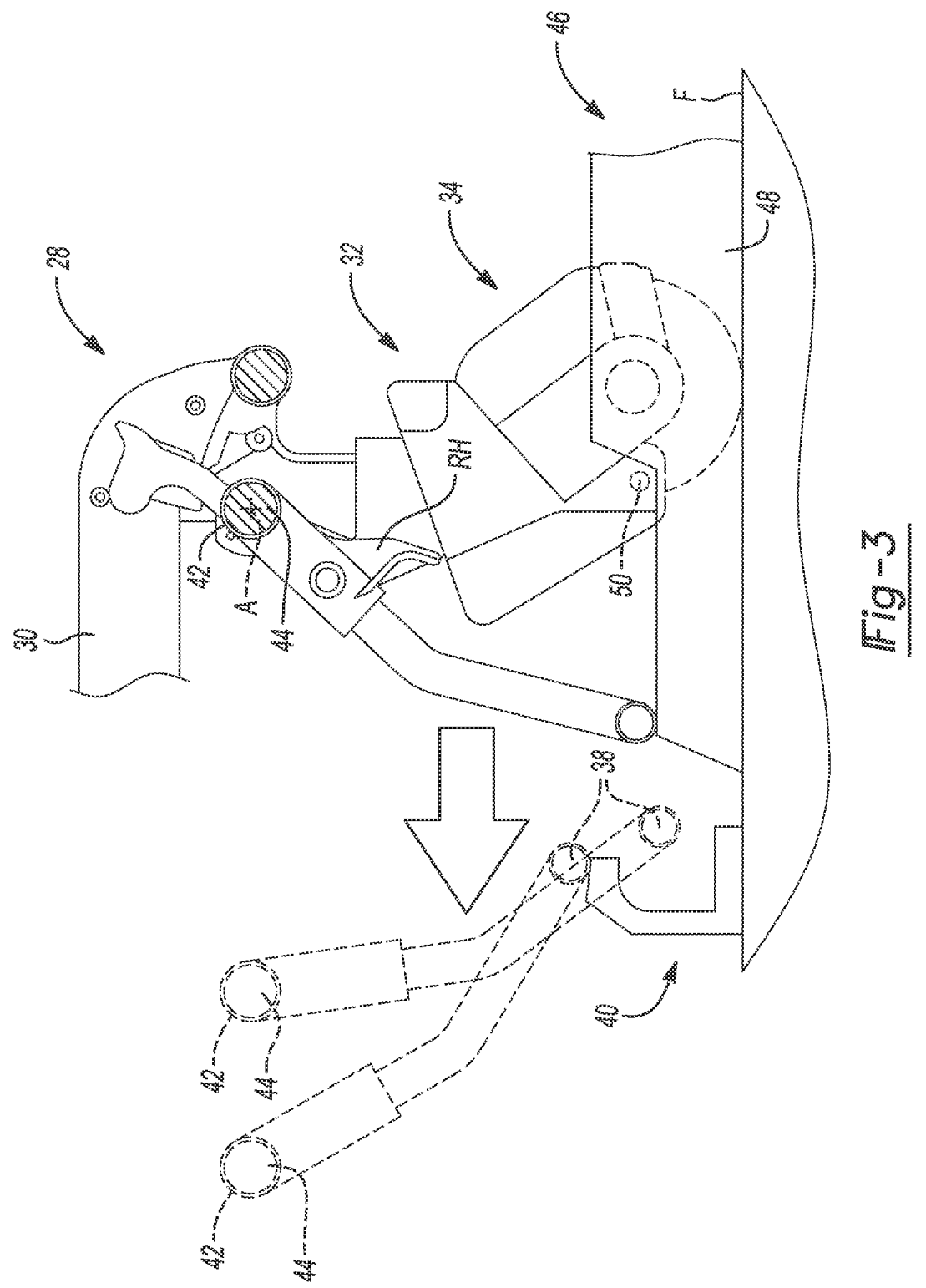
FIG. 3 is a cross-sectional view illustrating engagement of the engagement member of the patient transport apparatus by the retainer and release therefrom when used with a fastening system.

FIG. 3 illustrates use of the patient transport apparatus 10 with a fastening system 46 that secures the patient transport apparatus 10 in the transport vehicle VEH when loaded. The fastening system 46 comprises a track 48 fixed to the floor surface F. In this case, the engagement member 38, being spring-biased, rides along the track 48 when the patient transport apparatus 10 is being unloaded. This movement of the engagement member 38 is illustrated by showing a sequence of positions of the engagement member 38 in broken lines, including the release of the engagement member 38 from the retainer 40.

A dampener 50, described further below, is provided to increase resistance to movement of the patient transport apparatus 10 when pulling the patient transport apparatus 10 from the transport vehicle VEH to avoid the engagement member 38 inadvertently missing the retainer 40 and allowing the entire patient transport apparatus 10 to be pulled from the transport vehicle VEH before the base frame 14 and caster wheels 18 can be lowered to the ground.

Figure 4:
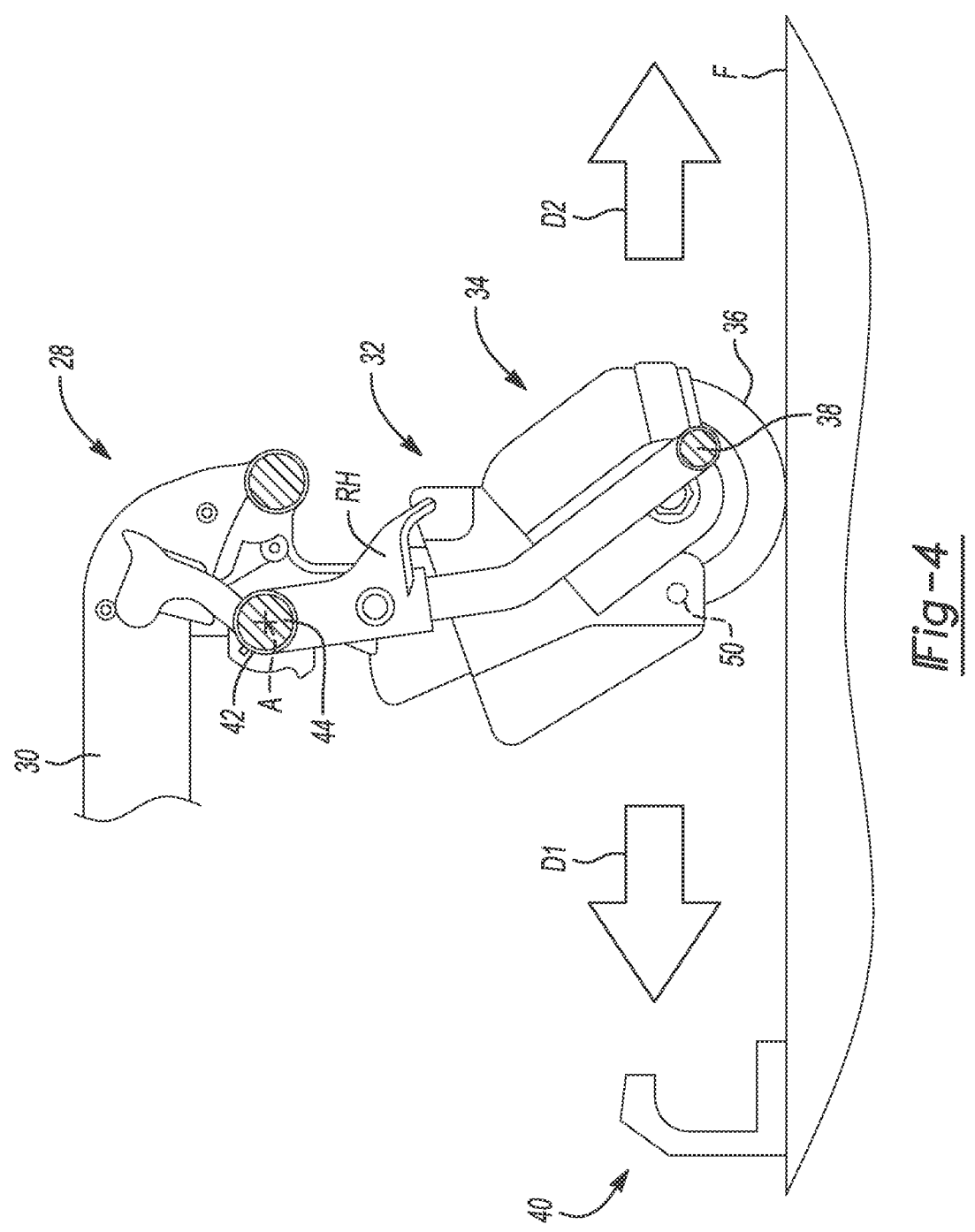
FIG. 4 is a cross-sectional view illustrating increased resistance to movement of the patient transport apparatus toward the retainer as compared to movement of the patient transport apparatus away from the retainer.

Referring to FIG. 4, the dampener 50 is coupled to the support structure 12 (e.g., coupled to the retracting head section 28, which forms part of the support structure 12) and is operable in a standby state or a resistance state such that the dampener 50 provides increased resistance to movement of the patient transport apparatus 10 in the resistance state as compared to the standby state. The resistance state is activated by manually moving the patient transport apparatus 10 in a first direction D1 and the standby state is activated by manually moving the patient transport apparatus 10 in a second direction D2, opposite the first direction D1.

Referring to FIGS. 5A, 5B and 6A, 6B, the dampener 50 is shown integrated into one of the loading wheel assemblies 32. It should be appreciated that the dampener 50 could be integrated into one or both of the loading wheel assemblies 32. Also, the dampener 50 could be located at any suitable location on the patient transport apparatus 10 and be integrated into any suitable component of the patient transport apparatus 10 to provide resistance to movement of the patient transport apparatus 10 during unloading and/or during any other movement in which such resistance is desirable.

In the embodiment shown, the dampener 50 comprises a dampening element 52, such as a pin, located in the wheel housing 34. In other embodiments, two or more dampening elements may be employed. The dampening element 52 is arranged to act between the wheel housing 34 and the loading wheel 36 to provide resistance to rotation of the loading wheel 36 in the resistance state. The wheel housing 34 defines a pair of opposing slots 54 (only one shown) and the dampening element 52 is disposed in the slots 54 (one slot could be employed). The dampening element 52 is configured to move in the slots 54 from a standby position (see FIGS. 5B and 6B) to a resistance position (see FIGS. 5A and 6A). The standby position corresponds to the standby state and the resistance position corresponds to the resistance state.

Figure 5A:
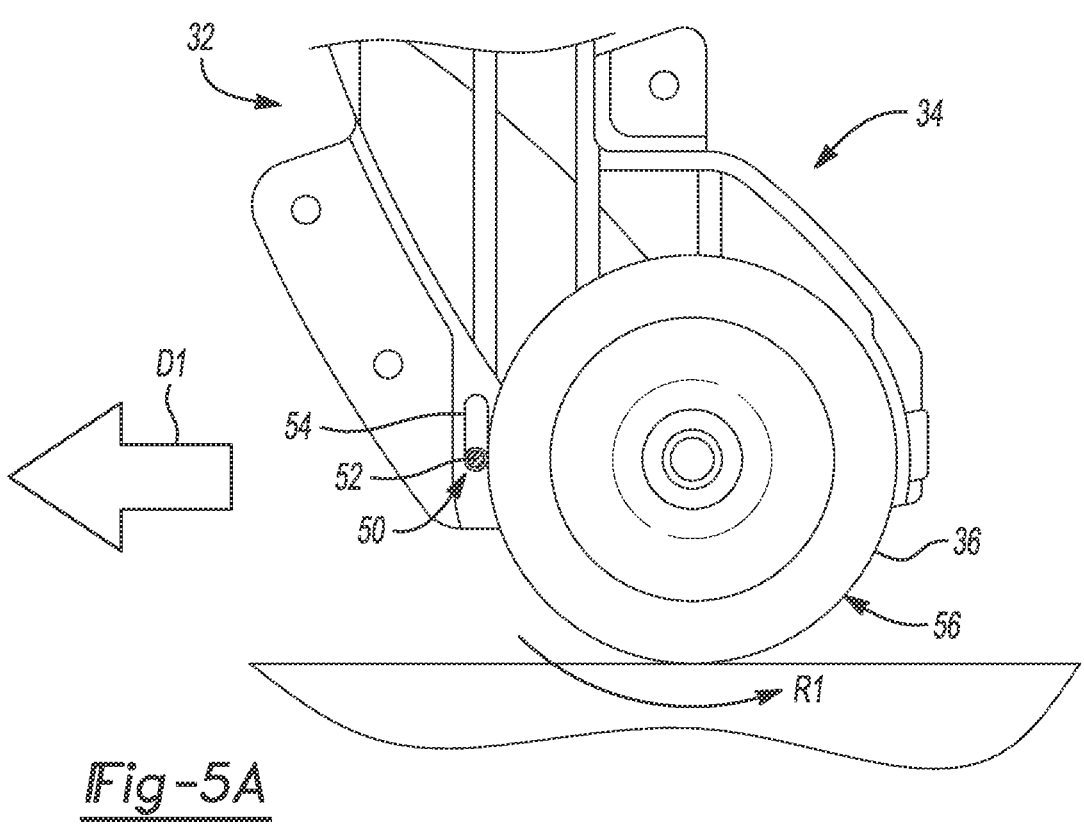
FIGS. 5A, 5B and 6A, 6B are partial cross-sectional views illustrating operation of a dampener of the patient transport apparatus.
Figure 5B:
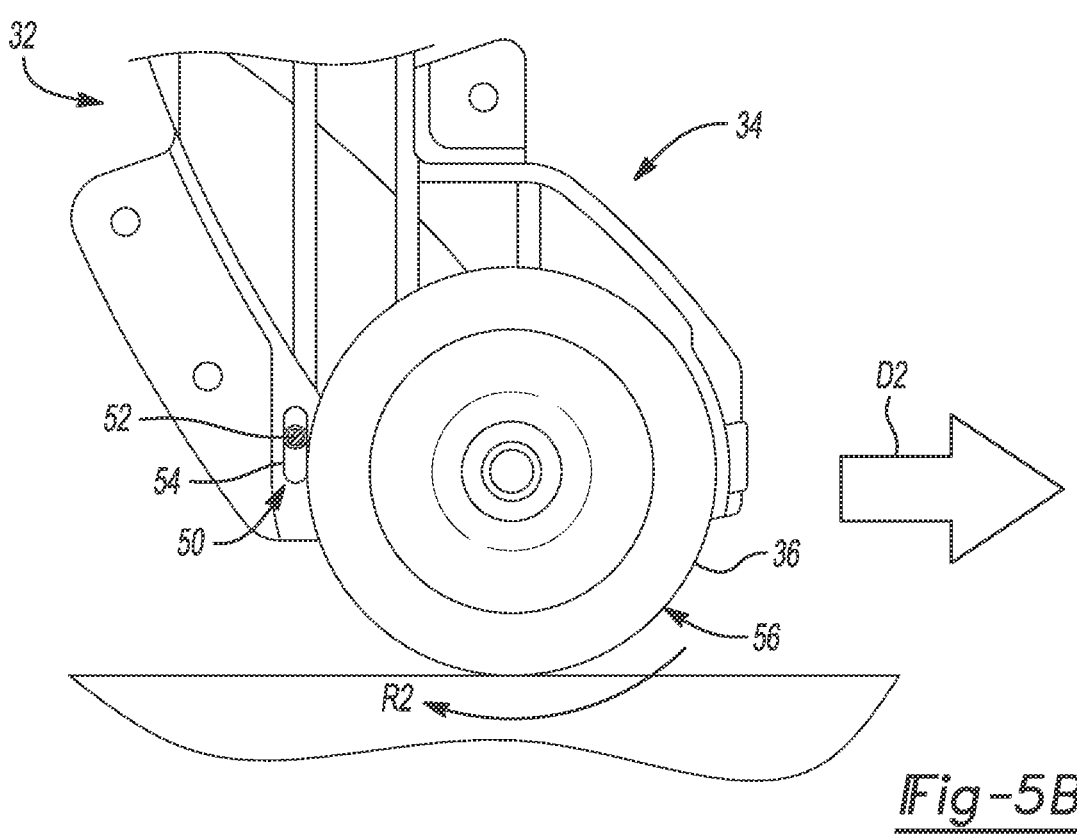
Figures 6A, 6B:
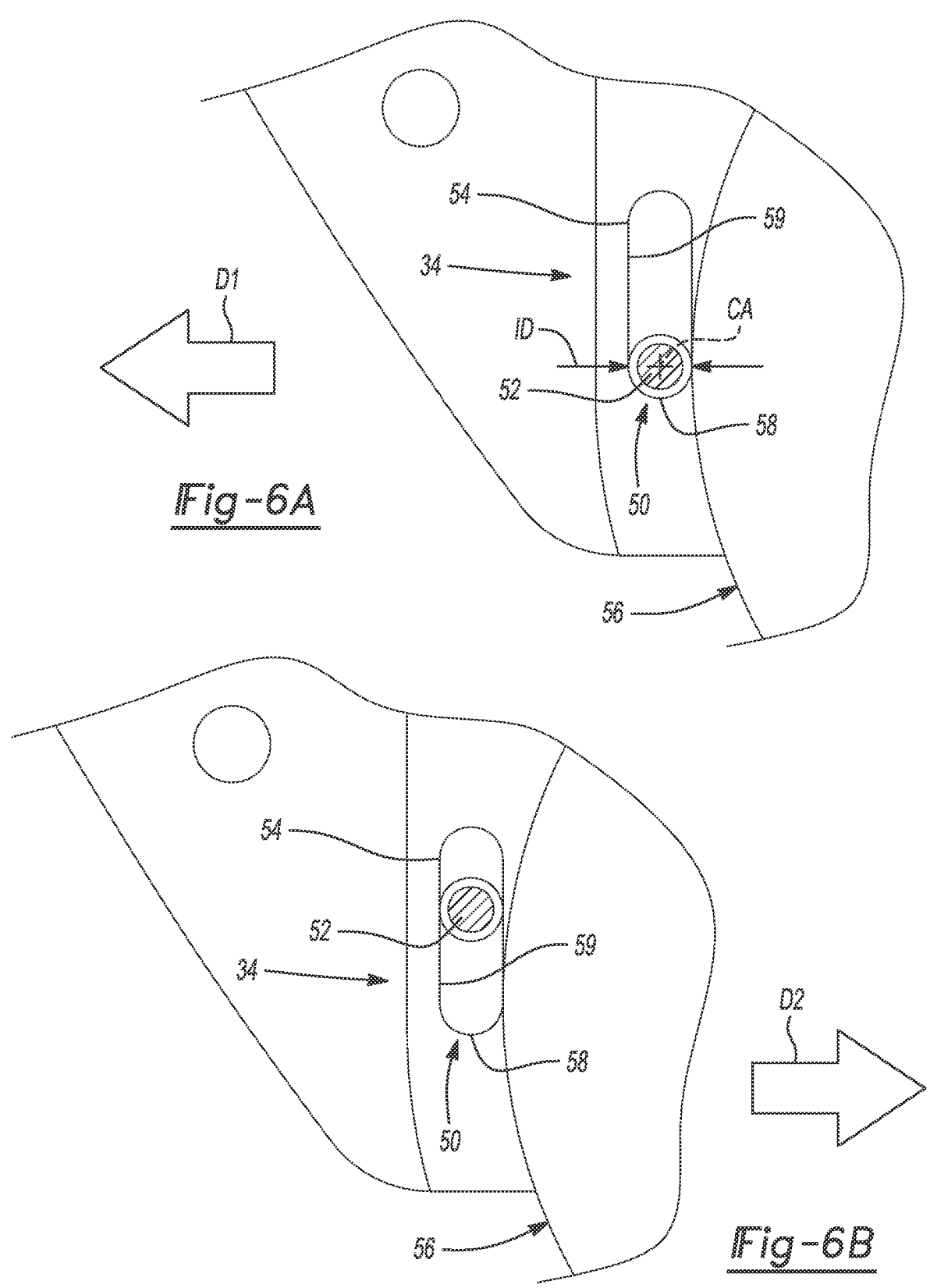

The dampening element 52 provides increased resistance to rotation of the loading wheel 36 when the loading wheel 36 is rotating in a first rotational direction R1 and the dampening element 52 is in the resistance position (FIGS. 5A and 6A) as compared to when the loading wheel 36 is rotating in a second rotational direction R2, opposite the first rotational direction R1, and the dampening element 52 is in the standby position (FIGS. 5B and 6B).

In the version shown, the dampening element 52 is sized and shaped to provide interference with an outer surface 56 of the loading wheel 36 in the resistance position, as shown in FIG. 6A. More specifically, when the loading wheel 36 initially rotates in the first rotational direction R1, the outer surface 56 of the loading wheel 36 frictionally engages the dampening element 52 and drives the dampening element 52 to a lower end 58 of the slots 54. Once at the lower end 58 of the slots 54, the dampening element 52 continues to be engaged by the outer surface 56 of the loading wheel 36, but the dampening element 52 also bears against the wheel housing 34, thereby causing resistance to rotation of the loading wheel 36. Said differently, the outer surface 56 rubs against the dampening element 52, which is trapped in the lower end 58 of the slots 54, and the associated friction dampens rotation of the loading wheel 36.

In the embodiment shown, the outer surface 56 is spaced from a back wall 59 of the slots 54 by an interference dimension ID, which is smaller than a diameter of the dampening element 52. The interference dimension ID may be measured along a line perpendicular to the back wall 59 that passes through a center axis CA of the dampening element 52 in the resistance position (see FIG. 6A). This interference dimension ID may be of any magnitude suitable to provide resistance to rotation of the loading wheel 36. In one specific version, the interference dimension ID is from 5.8 to 5.9 millimeters whereas the diameter of the dampening element 52 is from 6.3 to 6.4 millimeters thereby providing about 0.5 millimeters of interference to provide the desired resistance. Of course, other magnitudes of the interference dimension ID and other diameters of the dampening element 52 are possible. The resistance may be suitable to slow rotation of the loading wheel 36, but not of such magnitude that movement is arrested altogether. In other words, during normal unloading, the loading wheels 36 are still able to roll along the floor surface F without excessive force being applied by the users. The dampening elements 52 and/or the loading wheels 36 may be formed of plastic, rubber, metal, or any suitable material to provide the desired resistance. In one version, the dampening elements 52 are formed of stainless steel and the loading wheels 36 are formed of a polyolefin compound. In one embodiment, the loading wheels 36 may be like those manufactured by Colson Group USA of Jonesboro, AR, e.g., Part No. 1.00004.53, which has a hardness of 70 (+/−5) Durometer Shore D.

In the version shown, the standby state of the dampener 50 (see FIGS. 5B and 6B) is activated by manually moving the patient transport apparatus 10 in the second direction D2, opposite the first direction D1. More specifically, when the loading wheel 36 rotates in the second rotational direction R2, the outer surface 56 of the loading wheel 36 engages the dampening element 52 and lifts it out from the lower end 58 of the slots 54 so that the dampening element 52 is positioned higher in the slots 54 at a location in which the outer surface 56 is unable to bear the dampening element 52 against the wheel housing 34. It should be appreciated that the resistance state is deactivated when the standby state is activated, and vice versa. It should further be appreciated that some dampening could occur in the standby state and that the difference between the resistance state and the standby state in some embodiments may simply be the magnitude of resistance being greater in the resistance state as compared to the standby state. It should also be appreciated that any suitable mechanism may be employed to activate/deactivate the resistance/standby states of the dampener 50. In the version shown, the resistance and standby states are automatically activated upon movement of the loading wheel 36 in the first rotational direction R1 and the second rotational direction R2, respectively. For example, a user input device, such as a switch, lever, etc. could be employed to be actuated by a user to switch between the resistance and standby states.

Figure 7:
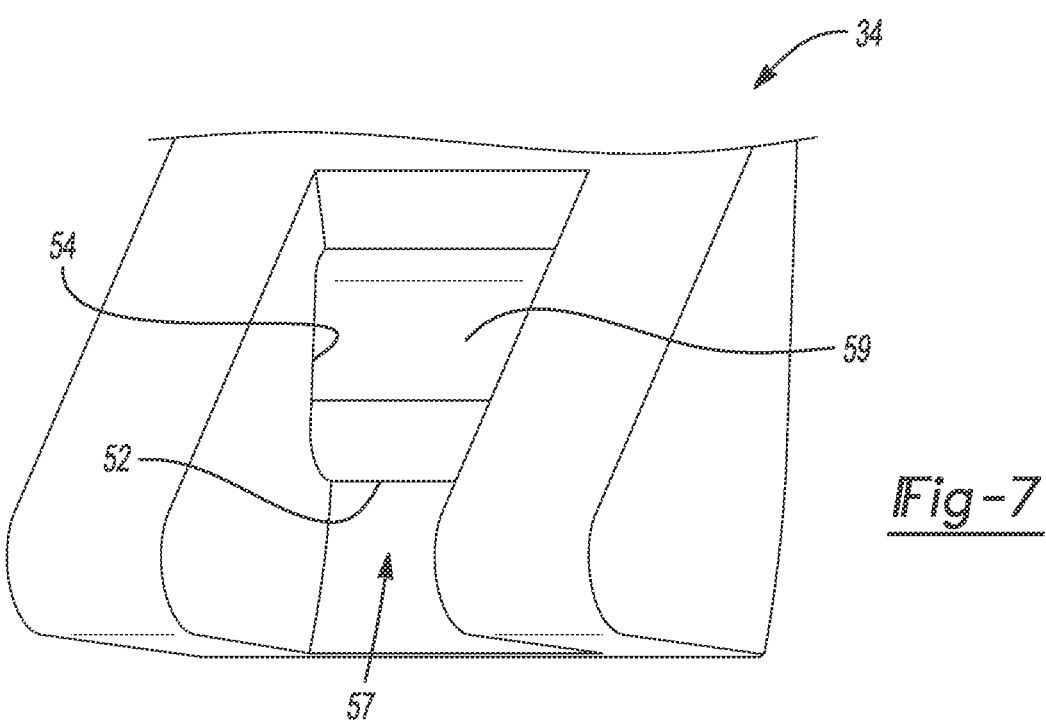
FIG. 7 is a perspective view of a portion of a wheel housing.
Figure 8:
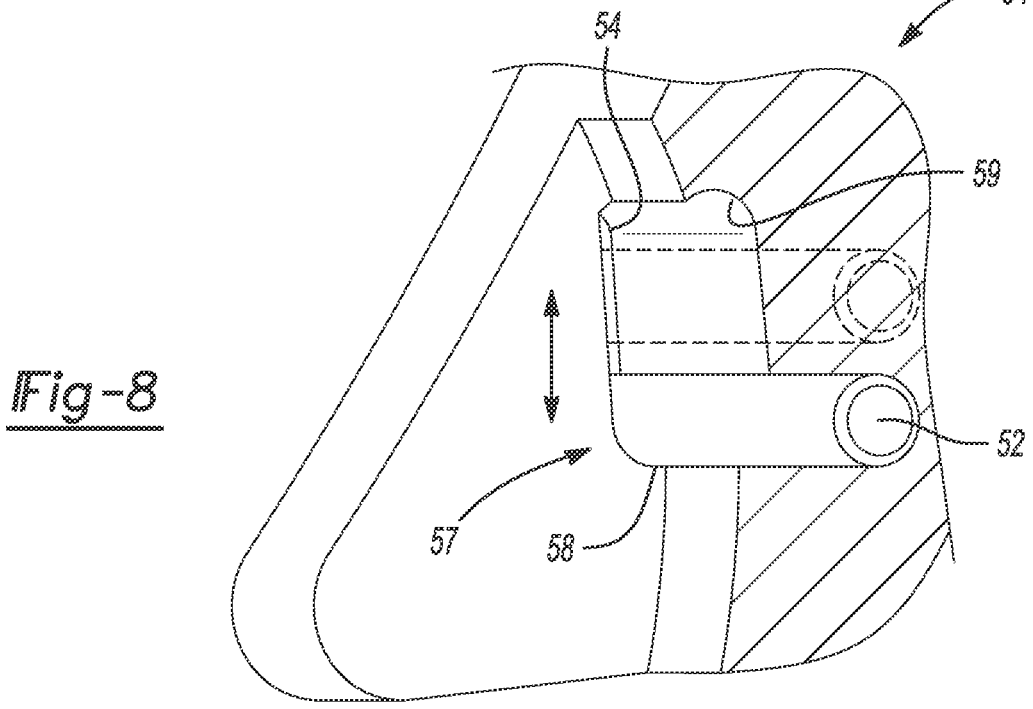
FIG. 8 is a partial cross-sectional and perspective view of the portion of the wheel housing of FIG. 7 illustrating the dampener in the wheel housing.

FIGS. 7 and 8 show close-up details of the portion of the wheel housing 34 that contains the slots 54 and the manner in which the dampening element 52 rides in the slots 54 between the resistance and standby positions (see arrow and broken lines in FIG. 8). Only one of the slots 54 is shown in FIGS. 7 and 8, but the opposing slot is a mirror image of the slot 54 shown. The opposing slots 54 extend on either side of a pocket 57 sized and shaped to receive the loading wheel 36 (loading wheel 36 not shown in FIGS. 7 and 8), i.e., one slot 54 on either side of the pocket 57. The pocket 57 is arranged so that the outer surface 56 of the loading wheel 36 is able to engage the dampening element 52 in the pocket 57 by virtue of the dampening element 52 extending partially into the pocket 57 between the slots 54.

Figure 9:
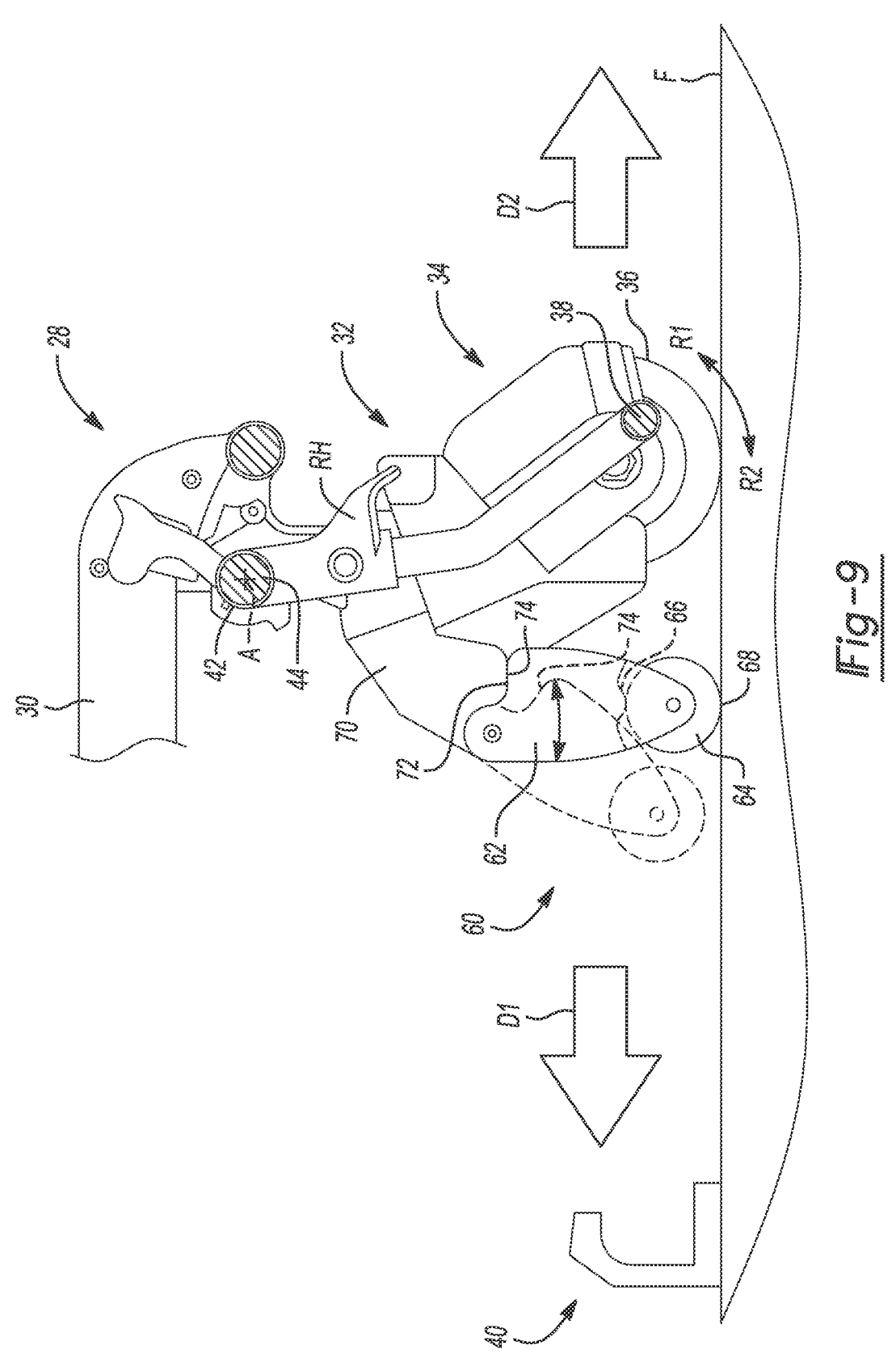
FIG. 9 illustrates an alternative dampener of the patient transport apparatus.

Referring to FIG. 9, an alternative dampener 60 is shown. In this embodiment, the dampener 60 comprises a swing arm 62 coupled to the support structure 12 (e.g., coupled to the retracting head section 28) and a dampening element 64 coupled to the swing arm 62. The dampening element 64 is movable relative to the support structure 12 from a standby position (see broken lines) to a resistance position (as shown) such that the dampening element 64 is in contact with the floor surface F in the resistance position. The standby position corresponds to the standby state and the resistance position corresponds to the resistance state.

Figure 10:
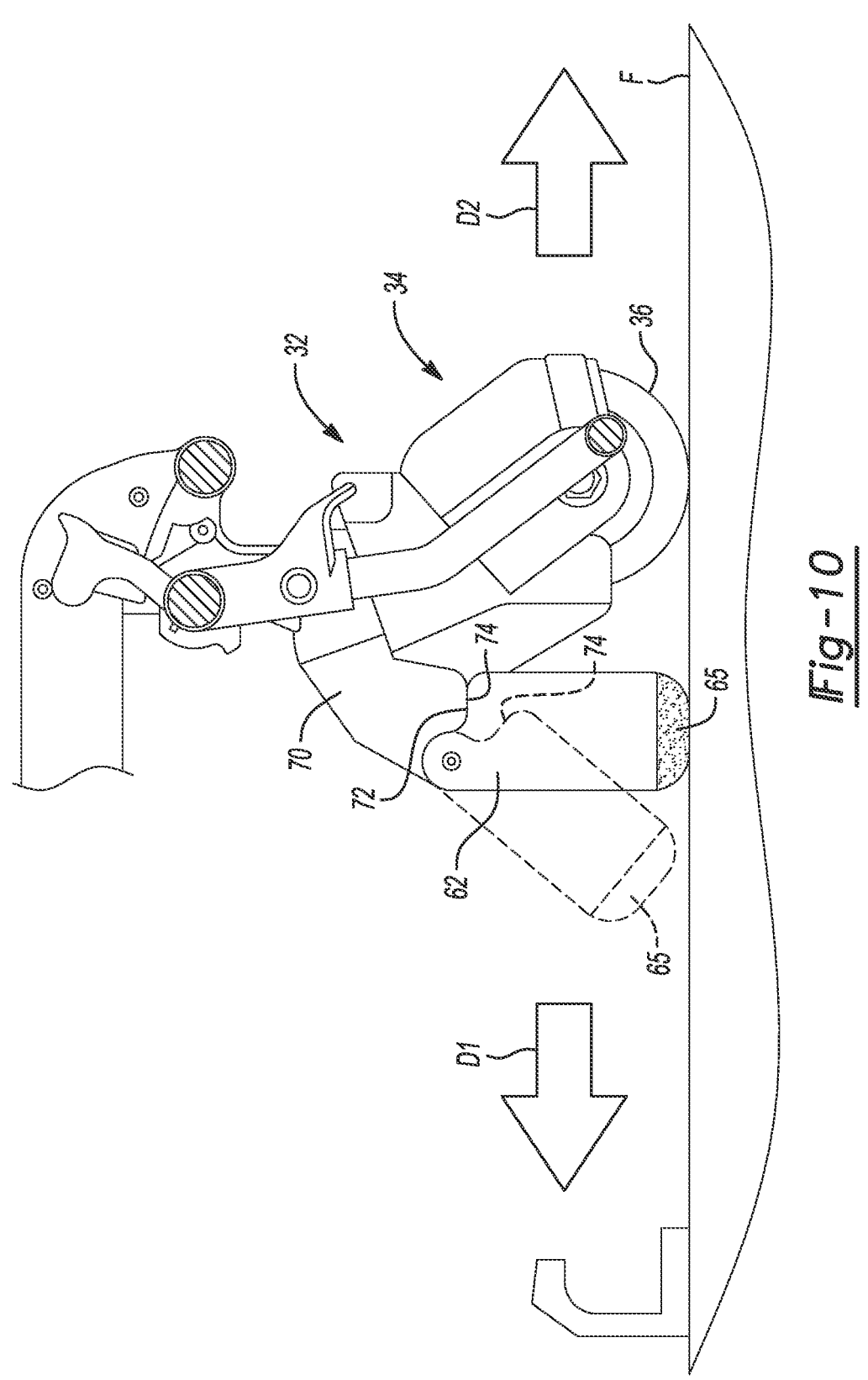
FIG. 10 illustrates another alternative dampener of the patient transport apparatus.

In the version shown, the dampening element 64 comprises a dampener wheel that is rotatably supported by the swing arm 62. A resistance pad 66 is coupled to the swing arm 62. The resistance pad 66 is configured to be in frictional contact with the dampening element 64 to dampen rotation of the dampening element 64 relative to the swing arm 62. Other dampening elements 64 could be employed, such as a resistance pad (e.g., a wear pad) or other frictional element configured to cooperate with the swing arm 62 in other ways to provide resistance, such as a resistance pad 65 fixed to the swing arm 62 that contacts the floor surface F, as shown in FIG. 10. The resistance pads may be formed of any suitable material, such as rubber, plastic, metal, or the like.

The dampening element 64 is sized and shaped to provide interference with the floor surface F in the resistance position, as shown in FIG. 9. In other words, an outer surface of the dampening element 64 deforms when engaging the floor surface F by virtue of the load of the patient transport apparatus 10 on the dampening element 64. When the patient transport apparatus 10 is initially moved in the first direction D1, the outer surface 68 of the dampening element 64 frictionally engages the floor surface F and drives the swing arm 62 to the resistance position. A mount arm 70 is fixed to the retracting head section 28. The swing arm 62 is pivotally connected to the mount arm 70 to pivot about a swing axis between the standby and resistance positions. The mount arm 70 has a shoulder 72 that abuts a corresponding shoulder 74 of the swing arm 62 to provide interference in the resistance position so that the dampening element 64 continuously engages the floor surface F during movement of the patient transport apparatus 10 in the first direction D1.

The dampening element 64 bears against the floor surface F and the resistance pad 66 in the resistance position, thereby causing resistance to rotation of the dampening element 64. In some cases, the outer surface 68 of the dampening element 64 is slightly compressed against the floor surface F to provide more interference with the floor surface F than the loading wheel 36. Said differently, the outer surface 68 rubs against the resistance pad 66 and the floor surface F, and the associated friction dampens movement of the patient transport apparatus 10. The resistance may be suitable to slow movement of the patient transport apparatus 10 during unloading, but not of such magnitude that movement is arrested altogether. In other words, during normal unloading, the patient transport apparatus 10 is still able to be moved without excessive force being applied by the users U.

In the version shown, the standby state of the dampener 60 (see broken lines) is activated by manually moving the patient transport apparatus 10 in the second direction D2, opposite the first direction D1. More specifically, when the patient transport apparatus 10 is moved in the second direction D2, the outer surface 68 of the dampening element 64 moves away from the floor surface F by virtue of the swing arm 62 being free to pivot relative to the mount arm 70 when moving in this direction. As a result, the shoulders 72, 74 separate from one another and the swing arm 62 freely hangs downward to rest against the floor surface F, ready to again engage the floor surface F and bear against the floor surface F should the patient transport apparatus 10 be moved in the first direction D1.

Figure 11:
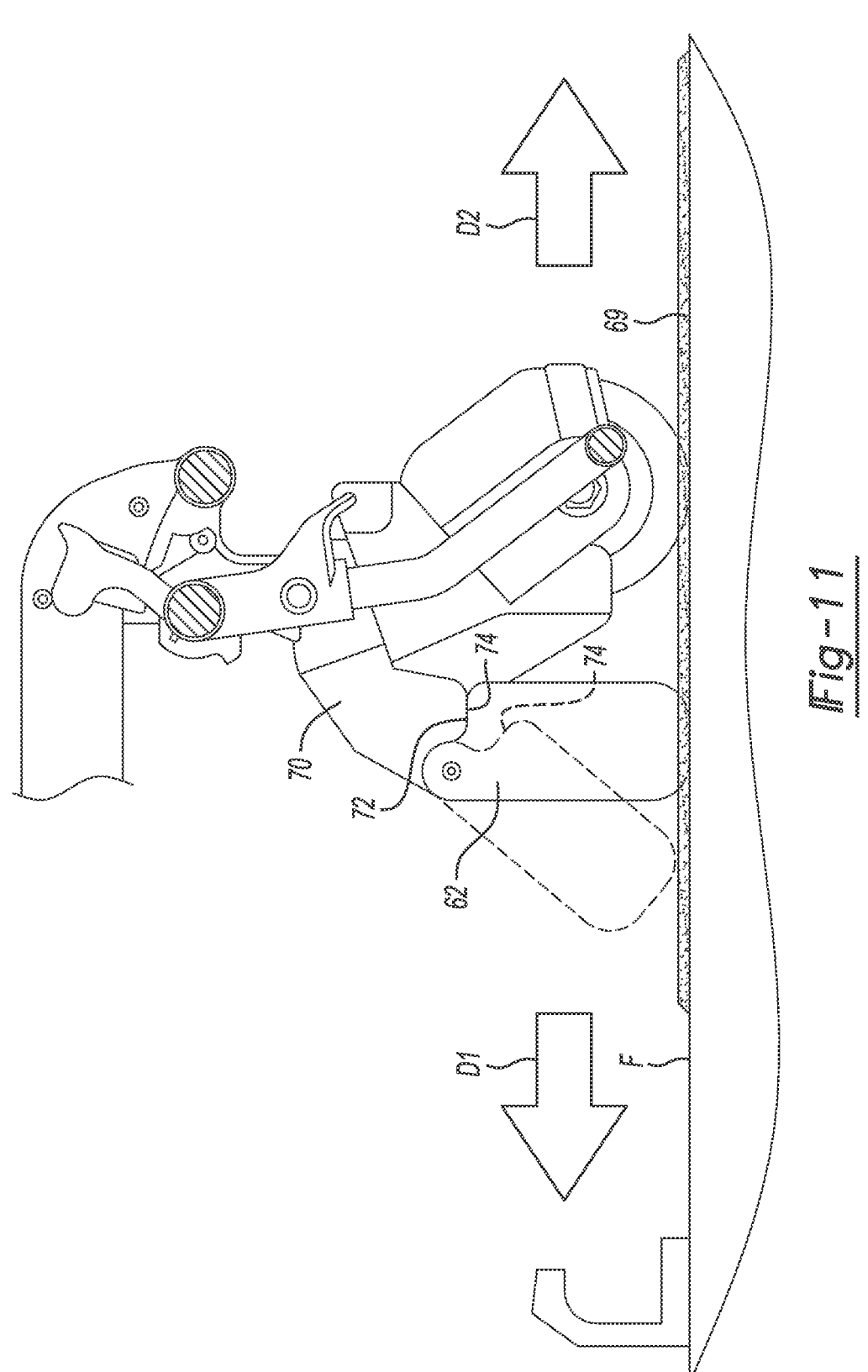
FIG. 11 illustrates another alternative dampener of the patient transport apparatus.

In some embodiments, like that shown in FIG. 11, a resistance pad 69 (e.g., a wear strip formed of rubber, plastic, or any suitable material) may be fixed to the floor surface F (or to the fastening system 46) to provide resistance to movement by virtue of cooperating with the swing arm 62, such as via contact with a distal end of the swing arm 62 when the swing arm 62 moves to the resistance position. In this version, the distal end of the swing arm 62 is arranged to interfere with the resistance pad 69 to provide resistance to movement in the resistance position. In such embodiments, the swing arm 62 may be considered the dampener by virtue of its interaction with the resistance pad 69 (and the swing arm 62 may comprise its own resistance pad). Accordingly, resistance to slow movement of the patient transport apparatus 10 may come from resistance associated with a resistance pad on the swing arm 62, the floor surface F, both, or any other suitable source of resistance. In other embodiments, resistance may be provided by the application of fluids (e.g., air or liquid), such as under pressure, to resist movement of the patient transport apparatus 10.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus for use with a retainer of a transport vehicle, the patient transport apparatus comprising:

a support structure comprising a patient support surface to support a patient;

an engagement member coupled to the support structure and configured to engage the retainer when unloading the patient transport apparatus from the transport vehicle; and a dampener coupled to the support structure and operable in a standby state or a resistance state such that the dampener provides increased resistance to movement of the patient transport apparatus in the resistance state as compared to the standby state, the resistance state configured to be activated by manually moving the patient transport apparatus in a first direction and the standby state configured to be activated by manually moving the patient transport apparatus in a second direction, opposite the first direction.

2. The patient transport apparatus of claim 1, comprising a plurality of caster wheel assemblies coupled to the support structure and a loading wheel assembly coupled to the support structure, the loading wheel assembly being movable in elevation relative to the caster wheel assemblies.

3. The patient transport apparatus of claim 2, wherein the dampener is integrated into the loading wheel assembly.

4. The patient transport apparatus of claim 3, wherein the loading wheel assembly comprises a wheel housing and a loading wheel rotatably coupled to the wheel housing, the dampener being located in the wheel housing.

5. The patient transport apparatus of claim 4, wherein the dampener comprises a dampening element arranged to act between the wheel housing and the loading wheel to provide resistance to rotation of the loading wheel in the resistance state.

6. The patient transport apparatus of claim 5, wherein the wheel housing defines a slot and the dampening element comprises a pin disposed in the slot, the pin configured to move in the slot from a standby position to a resistance position such that the pin provides increased resistance to rotation of the loading wheel when the loading wheel is rotating in a first rotational direction and the pin is in the resistance position as compared to when the loading wheel is rotating in a second rotational direction, opposite the first rotational direction, and the pin is in the standby position.

7. The patient transport apparatus of claim 1, wherein the dampener comprises a swing arm coupled to the support structure.

8. The patient transport apparatus of claim 7, comprising a resistance pad coupled to the swing arm, wherein the dampener further comprises a dampener wheel and the resistance pad is in frictional contact with the dampener wheel to dampen rotation of the dampener wheel relative to the swing arm.

9. The patient transport apparatus of claim 7, wherein the dampener further comprises a resistance pad fixed to the swing arm.

10. The patient transport apparatus of claim 1, wherein the support structure comprises a retracting head section and the engagement member comprises a bar pivotally connected to the retracting head section.

11. A patient transport system for use with a transport vehicle, the patient transport system comprising:

a retainer; and a patient transport apparatus comprising:

a support structure comprising a patient support surface to support a patient;

an engagement member coupled to the support structure and configured to engage the retainer when unloading the patient transport apparatus from the transport vehicle; and a dampener coupled to the support structure and operable in a standby state or a resistance state such that the dampener provides increased resistance to movement of the patient transport apparatus in the resistance state as compared to the standby state, the resistance state configured to be activated by manually moving the patient transport apparatus in a first direction and the standby state configured to be activated by manually moving the patient transport apparatus in a second direction, opposite the first direction.

12. The patient transport system of claim 11, comprising a plurality of caster wheel assemblies coupled to the support structure and a loading wheel assembly coupled to the support structure, the loading wheel assembly being movable in elevation relative to the caster wheel assemblies.

13. The patient transport system of claim 12, wherein the dampener is integrated into the loading wheel assembly.

14. The patient transport system of claim 13, wherein the loading wheel assembly comprises a wheel housing and a loading wheel rotatably coupled to the wheel housing, the dampener being located in the wheel housing.

15. The patient transport system of claim 14, wherein the dampener comprises a dampening element arranged to act between the wheel housing and the loading wheel to provide resistance to rotation of the loading wheel; and wherein the wheel housing defines a slot and the dampening element comprises a pin disposed in the slot, the pin configured to move in the slot from a standby position to a resistance position such that the pin provides increased resistance to rotation of the loading wheel when the loading wheel is rotating in a first rotational direction and the pin is in the resistance position as compared to when the loading wheel is rotating in a second rotational direction, opposite the first rotational direction, and the pin is in the standby position.

16. The patient transport apparatus of claim 11, wherein the dampener comprises a swing arm coupled to the support structure and a dampening element configured to cooperate with the swing arm.

17. The patient transport apparatus of claim 16, comprising a resistance pad coupled to the swing arm, wherein the dampening element comprises a dampener wheel and the resistance pad is in frictional contact with the dampener wheel to dampen rotation of the dampener wheel relative to the swing arm.

18. The patient transport apparatus of claim 16, wherein the dampening element comprises one or more of a resistance pad fixed to the swing arm or a resistance pad configured to be fixed to a floor surface of the transport vehicle.

19. The patient transport apparatus of claim 11, wherein the support structure comprises a retracting head section and the engagement member comprises a bar pivotally connected to the retracting head section; and wherein the retainer comprises a hook and the bar is shaped to be engaged by the hook.

20. A patient transport apparatus for use with a retainer of a transport vehicle, the patient transport apparatus comprising:

a support structure comprising a patient support surface to support a patient;

an engagement member coupled to the support structure and configured to engage the retainer of the transport vehicle when unloading the patient transport apparatus from the transport vehicle; and a dampener coupled to the support structure for operably engaging the transport vehicle as the patient transport apparatus moves within the transport vehicle, the dampener being operable between:

a resistance state activated by manually moving the patient transport apparatus within the transport vehicle in a first direction towards the retainer, and a standby state activated by manually moving the patient transport apparatus within the transport vehicle in a second direction away from the retainer; and wherein the dampener is configured to provide more resistance to movement of the patient transport apparatus relative to the transport vehicle during operation in the resistance state than during operation in the standby state.

* * * * *